United States Patent
Lai et al.

(10) Patent No.: US 9,239,918 B2
(45) Date of Patent: Jan. 19, 2016

(54) METHOD AND APPARATUS FOR SOFTWARE-HARDWARE AUTHENTICATION OF ELECTRONIC APPARATUS

(71) Applicant: Andes Technology Corporation, Hsin-Chu (TW)

(72) Inventors: Chi-Chang Lai, Hsinchu County (TW); Chun-Chang Yu, Yuanli Township, Miaoli County (TW)

(73) Assignee: ANDES TECHNOLOGY CORPORATION, Hsin-Chu (TW)

( * ) Notice: Subject to any disclaimer, the term of this patent is extended or adjusted under 35 U.S.C. 154(b) by 206 days.

(21) Appl. No.: 14/044,227

(22) Filed: Oct. 2, 2013

(65) Prior Publication Data

US 2015/0095978 A1 Apr. 2, 2015

(51) Int. Cl.
*G06F 21/44* (2013.01)

(52) U.S. Cl.
CPC ...................................... *G06F 21/44* (2013.01)

(58) Field of Classification Search
CPC ..................................................... G06F 21/44
USPC .............. 726/2, 3, 4, 5, 6, 7; 713/2, 176, 156, 713/340
See application file for complete search history.

(56) References Cited

U.S. PATENT DOCUMENTS

| 5,754,761 | A | 5/1998 | Willsey |
| 7,216,369 | B2 | 5/2007 | Wiseman et al. |
| 7,386,735 | B2 | 6/2008 | Eitel et al. |
| 7,739,517 | B2 | 6/2010 | Sahita et al. |
| 2004/0098591 | A1 | 5/2004 | Fahrny |
| 2006/0064756 | A1 | 3/2006 | Ebert |
| 2008/0276094 | A1* | 11/2008 | Maeda ........................ 713/176 |
| 2013/0318607 | A1* | 11/2013 | Reed et al. ..................... 726/23 |

* cited by examiner

*Primary Examiner* — Brandon Hoffman
*Assistant Examiner* — Nega Woldemariam
(74) *Attorney, Agent, or Firm* — Muncy, Geissler, Olds & Lowe, P.C.

(57) ABSTRACT

The present invention discloses a method for software-hardware authentication of an electronic apparatus includes receiving a challenge string (CS) from the electronic apparatus through a challenge string input port (CSIP). The challenge string is a string of trace data generated according to some operations of software running on the electronic apparatus. An authentication result for use in an authentication process for the software to authenticate a hardware unit of the electronic apparatus or for the hardware unit to authenticate the software is generated according to the string of the trace data. The authentication process is performed according to the generated authentication result.

17 Claims, 4 Drawing Sheets

METHOD AND APPARATUS FOR SOFTWARE-HARDWARE AUTHENTICATION OF ELECTRONIC APPARATUS

BACKGROUND

1. Technical Field

The present invention relates to a method and apparatus for authentication. More particularly, the present invention relates to a method and apparatus for software-hardware authentication of an electronic apparatus.

2. Description of Related Art

Authentication is the act of confirming the truth of an attribute of a datum or entity. With the advent of the digital era, there has been an ever-increasing need for electronic apparatuses to provide authentication functions, especially electronic apparatuses that include both a hardware component and a software component.

Such authentication functions may include a process in which hardware authenticates software, as well as a process in which software authenticates hardware. In the case of hardware authenticating software, the (authentication dependent) hardware may enable some hardware function for normal operations of the software or disable some hardware function to inhibit some normal operations of the software according to different authentication results. In the case of software authenticating hardware, the software may determine whether it should operate normally with the hardware by performing some appropriate corrections on some of its flow control decision variables or on some of its instruction codes according to different authentication results.

SUMMARY

According to one embodiment of this invention, a method for software-hardware authentication of an electronic apparatus is disclosed. The method for software-hardware authentication of an electronic apparatus includes the following steps: receiving a challenge string (CS) from the electronic apparatus through a challenge string input port (CSIP), wherein the CS is a string of trace data generated according to some operations of software running on the electronic apparatus; generating an authentication result for use in an authentication process for the software to authenticate a hardware unit of the electronic apparatus or for the hardware unit to authenticate the software according to the string of the trace data; and performing the authentication process according to the generated authentication result.

According to another embodiment of this invention, an apparatus for software-hardware authentication of an electronic apparatus is disclosed. The apparatus for software-hardware authentication of an electronic apparatus includes a CSIP, an authentication-result generating unit and an authentication performing unit. The CSIP is used to receive a CS from the electronic apparatus. The CS is a string of trace data generated according to an operation of software running on the electronic apparatus. The authentication-result generating unit generates an authentication result for use in an authentication process for the software to authenticate a hardware unit of the electronic apparatus or for the hardware unit to authenticate the software according to the string of the trace data. The authentication performing unit performs the authentication process according to the generated authentication result.

According to another embodiment of this invention, a method for software-hardware authentication of an electronic apparatus is disclosed. The method for software-hardware authentication of an electronic apparatus includes the following steps: receiving a CS from the electronic apparatus through a CSIP, wherein the CS is generated according to some operation of the software running on the electronic apparatus; obtaining an authentication key (AK); converting the CS into an authentication string (AS) according to information of the AK, such that a length of the AS is equal to or shorter than a length of the CS; generating an authentication result signature (ARS) according to the AK and the AS; comparing the ARS with a pre-known signature (PKS) to determine an authentication result for use in the authentication process; and performing the authentication process according to the authentication result of the authentication process.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
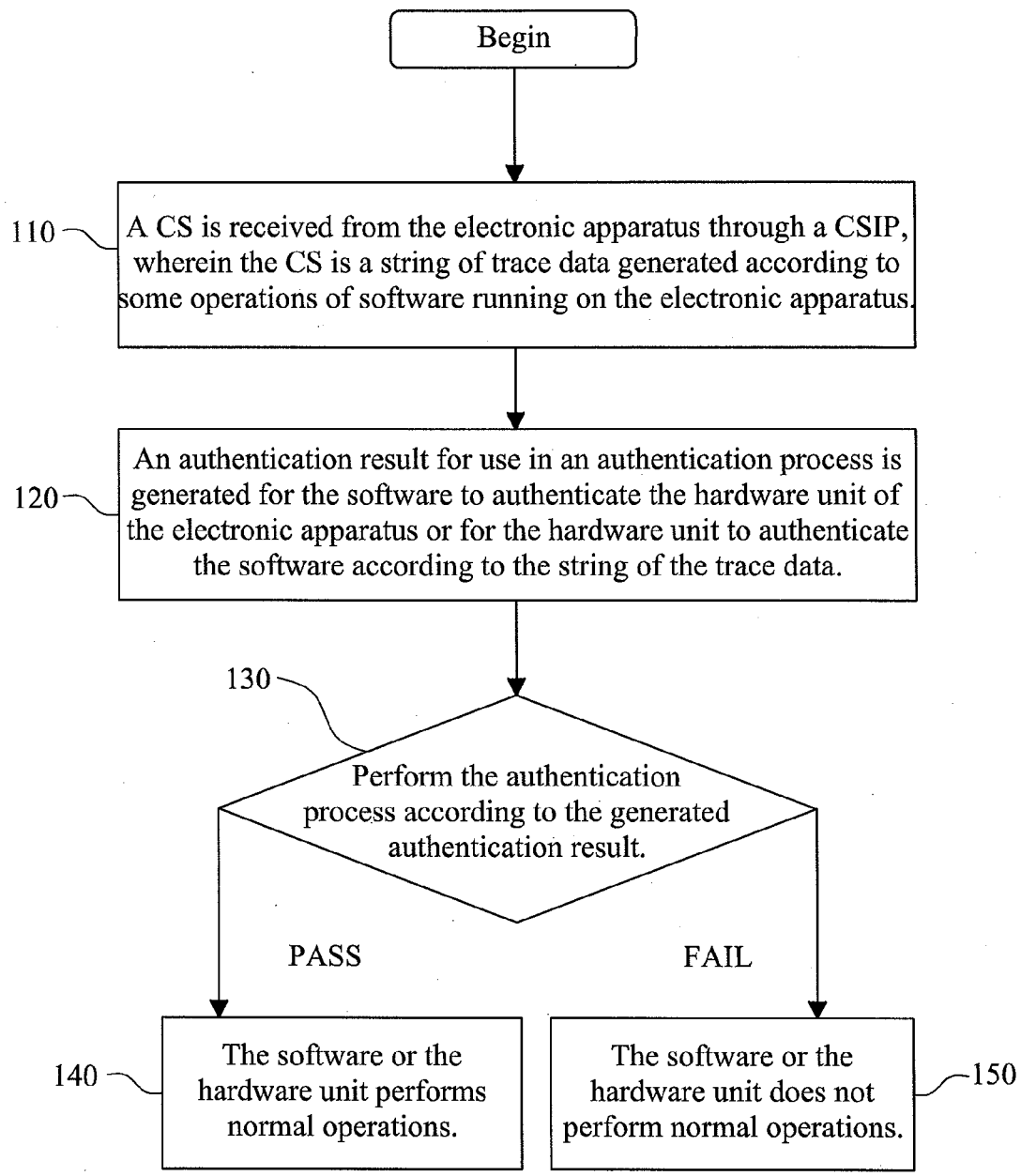
FIG. 1 is a flow diagram of a method for software-hardware authentication of an electronic apparatus according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a flow diagram will be described that illustrates a method for software-hardware authentication of an electronic apparatus according to one embodiment of this invention. The method for software-hardware authentication of an electronic apparatus may take the form of a computer program product stored on a non-transitory computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

The flow in FIG. 1 begins at step 110. First, a challenge string (CS) is received from the electronic apparatus through a challenge string input port (CSIP) (step 110). Software running on the electronic apparatus may either need to authenticate a hardware unit of the electronic apparatus to ensure that the software can perform normal operations on the hardware unit, or may need to be authenticated by the hardware unit to gain permission for execution on the hardware unit. In some embodiments of this invention, the CS is a string of trace data generated according to some operations of the software running on the electronic apparatus. In some embodiments of this invention, the CSIP may utilize one or more hardware registers or some shared memory to receive the CS. In addition, the trace data is something representing step-by-step execution behavior of a software program, or more generally of a sequence of master commands. Such trace data, like instruction execution trace data or bus transaction trace data, is usually generated by some hardware functions that monitoring the software or bus master behavior by probing signals inside a microprocessor or a bus master or bus controller. The hardware functions used to generate trace data is usually controlled separately, and is usually not controllable by the software or bus master with its behavior been traced. In some embodiments, a trace data marker, which is initiated by execution of some explicit software instruction or bus master command, may be utilized to enable the possibility for capturing of trace data been controlled by the software or the bus master been traced, or other supervisor software or bus master.

Next, an authentication result for use in an authentication process is generated for the software to authenticate the hardware unit of the electronic apparatus or for the hardware unit to authenticate the software according to the string of the trace data (step 120).

Next, the flow proceeds to step 130 to perform the authentication process according to the generated authentication result. Since the CS is a string of trace data generated according to some operation of the software running on the electronic apparatus, hackers can not easily figure out which part of trace data is taken for authentication. In addition, since the trace data is usually not accessible by software (trace data is usually transferred through hardware connection directly), the present invention is difficult to be hacked.

In some embodiments of this invention, the generated authentication result may be either "PASS" or "FAIL." "PASS" and "FAIL" indicate two different states for the authentication process. Hence, when the generated authentication result is PASS, the authentication dependent software or hardware unit may perform normal operations (step 140). When the generated authentication result is FAIL, the authentication dependent software or hardware unit may not perform normal operations (step 150). However, in some other embodiments, operations for these states may be differed, which should not be limited in this disclosure.

For the software to authenticate a hardware unit of the electronic apparatus, a portion of program codes of the software may require some fix-up. In this embodiment, when the generated authentication result is PASS, the authentication dependent software may fix-up the portion of program codes of the software, such that the software can perform normal operations (step 140). When the generated authentication result is FAIL, the portion of program codes of the software may remain the same, such that the software does not perform normal operations (step 150).

In some embodiments of this invention, the method for software-hardware authentication of an electronic apparatus may further include obtaining an authentication key (AK). The AK may be obtained from some hard-wired logic, some external inputs to the electronic apparatus, some embedded non-volatile storage of the electronic apparatus or a combination thereof. At least some portion of the AK is not known to the software, while some portion of the AK can be a known value identifying the electronic apparatus, such as the serial number of the electronic apparatus.

Figure 2:
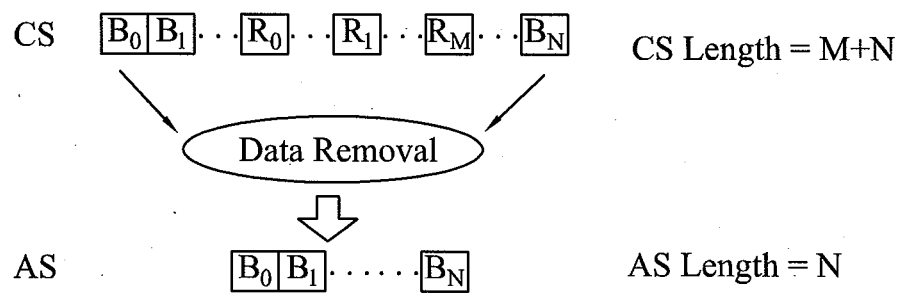
FIG. 2 illustrates an embodiment of converting a CS into an AS according to the information of an AK.

Next, the CS is converted into an authentication string (AS) according to information of the AK, such that a length of the AS is equal to or shorter than a length of the CS. Referring to FIG. 2, an embodiment of converting the CS into the AS according to the information of the AK is illustrated. In this embodiment, the step of converting the CS into the AS according to the information of the AK is done by removing redundant data $R_0, R_1, \ldots, R_M$ of the CS according to a portion of the information of the AK, such that the AS $B_0, B_1, \ldots, B_N$ can be obtained. In another embodiment, the step of converting the CS into the AS according to the information of the AK can be done by compressing the CS into the AS.

After the conversion, an authentication result signature (ARS) for the authentication process can be generated according to the AK and the AS. The function used to generate the ARS may be a checksum function, a CRC function, a cryptography function (such as RC4, MD5, SHA-1, DES, RSA, AES, etc) or any other mapping function utilizing the entire AS and the entire or a portion of the AK to generate the ARS.

Subsequently, the ARS can be further compared with a pre-known signature (PKS) to determine the generated authentication result. In some embodiments, the pre-known signature may be formed by some hard-wired logic or be pre-stored in a storage unit for comparison. Consequently, the authentication process at step 130 can be further performed according to the generated authentication result determined by the comparison.

In some embodiments, the length of CS (or CS length, CSL) may also be taken into consideration for authentication. For example, an associated CSL value corresponding to the CS received through the CSIP may be verified. Next, the associated CSL value may be compared with an Expected CS Length (ECSL) value associated with the AK. The generated authentication result may be determined further according to the result of comparing the associated CSL value with the ECSL value associated with the AK. For example, the generated authentication result may be determined FAIL when the ARS does not match the PKS, and the generated authentication result of the authentication process may be determined PASS when the associated CSL value is equal to the ECSL value and the ARS matches the PKS. In addition, the generated authentication result of the authentication process may be determined FALSE-FAIL when the associated CSL value is larger than the ECSL value and the ARS matches the PKS. "PASS," "FAIL" and "FALSE-FAIL" indicate three different states for the authentication process. For the authentication process, one or more types of the generated authentication results (i.e., PASS, FAIL, FALSE-FAIL, or combination thereof) may be implemented to enable or disable the authentication dependent software or hardware unit. Therefore, different degrees of authentication can be provided with these types of the generated authentication results.

Figure 3:
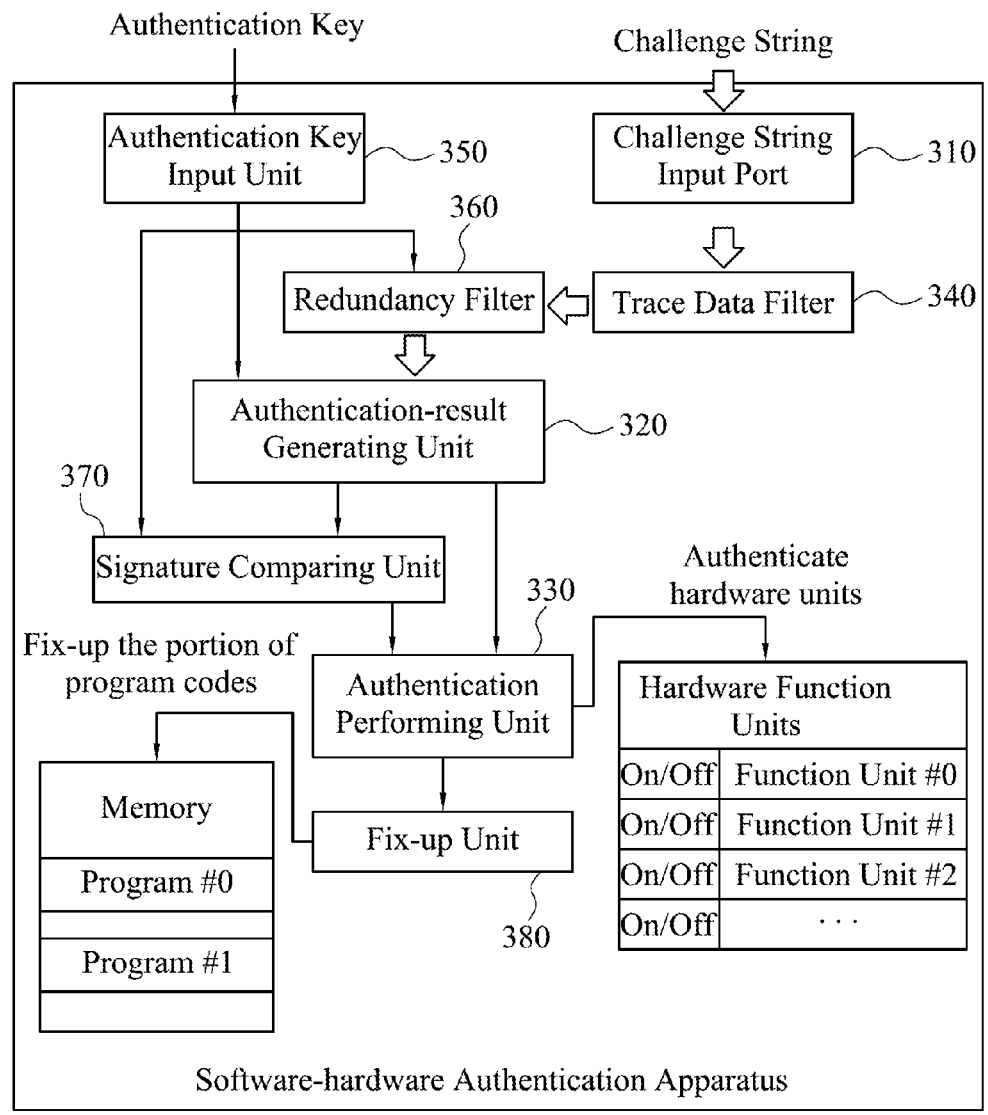
FIG. 3 illustrates a block diagram of an apparatus for software-hardware authentication of an electronic apparatus according to an embodiment of this invention.

FIG. 3 illustrates a block diagram of an apparatus for software-hardware authentication of an electronic apparatus according to an embodiment of this invention. The apparatus 300 for software-hardware authentication of an electronic apparatus includes a CSIP 310, an authentication-result generating unit 320 and an authentication performing unit 330. The authentication-result generating unit 320 and the authentication performing unit 330 may be implemented by at least one microprocessor or any other type of control unit.

A CS is received from the electronic apparatus through the CSIP 310. The software may either need to authenticate the hardware of the electronic apparatus to ensure that the software can perform normal operations on the hardware, or may need to be authenticated by the hardware to gain permission for execution on the hardware. The CS is a string of trace data generated according to some operation of the software running on the electronic apparatus. In some embodiments of this invention, the CSIP 310 may utilize one or more hardware registers or some shared memory to receive the CS. In addition, the trace data is something representing step-by-step execution behavior of a software program, or more generally of a sequence of master commands. Such trace data, like instruction execution trace data or bus transaction trace data, is usually generated by some hardware functions that monitoring software or bus master behavior by probing signals inside a microprocessor or a bus master or bus controller. The hardware functions used to generate trace data is usually controlled separately, and is not usually controllable by the software or bus master with its behavior been traced. In some embodiments, a trace data filter 340 may utilize a trace data marker, which is initiated by execution of some explicit software instruction or bus master command, to enable the possibility for capturing of trace data been controlled by the software or the bus master been traced, or other supervisor software or bus master.

The authentication-result generating unit 320 generates an authentication result for use in an authentication process for the software to authenticate a hardware unit of the electronic apparatus or for the hardware unit to authenticate the software according to the string of the trace data. The authentication performing unit 330 performs the authentication process according to the generated authentication result. Since the CS is a string of trace data generated according to some operation of the software running on the electronic apparatus, hackers can not easily figure out which part of trace data is taken for authentication. In addition, since the trace data is usually not accessible by software (trace data is usually transferred through hardware connection directly), the present invention is difficult to be hacked For the software to authenticate a hardware unit of the electronic apparatus, a portion of program codes of the software may require some fix-up. In this embodiment, the apparatus 300 for software-hardware authentication may further include fix-up unit 380. When the generated authentication result is PASS, the fix-up unit 380 may fix-up the portion of program codes of the software. In some embodiments, the fix-up unit 380 may fix-up the portion of program codes of the software according to control/status/indication flags derived from the generated authentication result. When the generated authentication result is FAIL, the fix-up unit 380 may be disabled, such that fix-up is not performed and the portion of program codes of the (authentication dependent) software may remain the same and the (authentication dependent) software may not perform normal operations.

In some embodiments, the apparatus 300 for software-hardware authentication of the electronic apparatus may further include an AK input unit 350, a redundancy filter 360 and a signature comparing unit 370. An AK may be obtained through the AK input unit 350. The AK input unit 350 may be connected to a hard-wired logic, an external input to the electronic apparatus, an embedded non-volatile storage of the electronic apparatus or a combination thereof to obtain the AK. At least some portion of the AK is not known to the software, while some portion of the AK can be a known value identifying the electronic apparatus, such as the serial number of the electronic apparatus.

The redundancy filter 360 may convert the CS into an AS according to information of the AK, such that a length of the AS is equal to or shorter than a length of the CS. In some embodiments, the redundancy filter 360 may remove redundant data of the CS according to a portion of the information of the AK to generate the AS. In another embodiment, the redundancy filter 360 may compress the CS to generate the AS.

After the conversion, the signature comparing unit 370 generates an ARS according to the AK and the AS. The signature comparing unit 370 may perform a checksum function, a CRC function, a cryptography function (such as RC4, MD5, SHA-1, DES, RSA, AES, etc) or any other mapping function utilizing the entire AS and the entire or a portion of the AK to generate the ARS.

Subsequently, the signature comparing unit 370 further compares the ARS with a PKS to determine the generated authentication result. The authentication performing unit 330 may further perform the authentication process according to the generated authentication result determined by the comparison.

In some embodiments, CSL may also be taken into consideration for authentication. For example, the authentication-result generating unit 320 may verify an associated CSL value corresponding to the CS received through the CSIP 310. Next, the authentication-result generating unit 320 may compare the associated CSL value with an ECSL value associated with the AK. Accordingly, the signature comparing unit 370 may determine the generated authentication result further according to the result of comparing the associated CSL value with the ECSL value associated with the AK. For example, the signature comparing unit 370 may determine that the generated authentication result is FAIL when the ARS does not match the PKS, and the signature comparing unit 370 may determine that the generated authentication result is PASS when the associated CSL value is equal to the ECSL value and the ARS matches the PKS. In addition, the signature comparing unit 370 may determine that the generated authentication result is FALSE-FAIL when the associated CSL value is larger than the ECSL value and the ARS matches the PKS. "PASS," "FAIL" and "FALSE-FAIL" indicate three different states for the authentication process. For the authentication process, one or more types of the generated authentication results (i.e., PASS, FAIL, FALSE-FAIL, or combination thereof) may be implemented to enable or disable the authentication dependent software or hardware unit. Therefore, different degrees of authentication can be provided with respect to different types of the generated authentication results.

Figure 4:
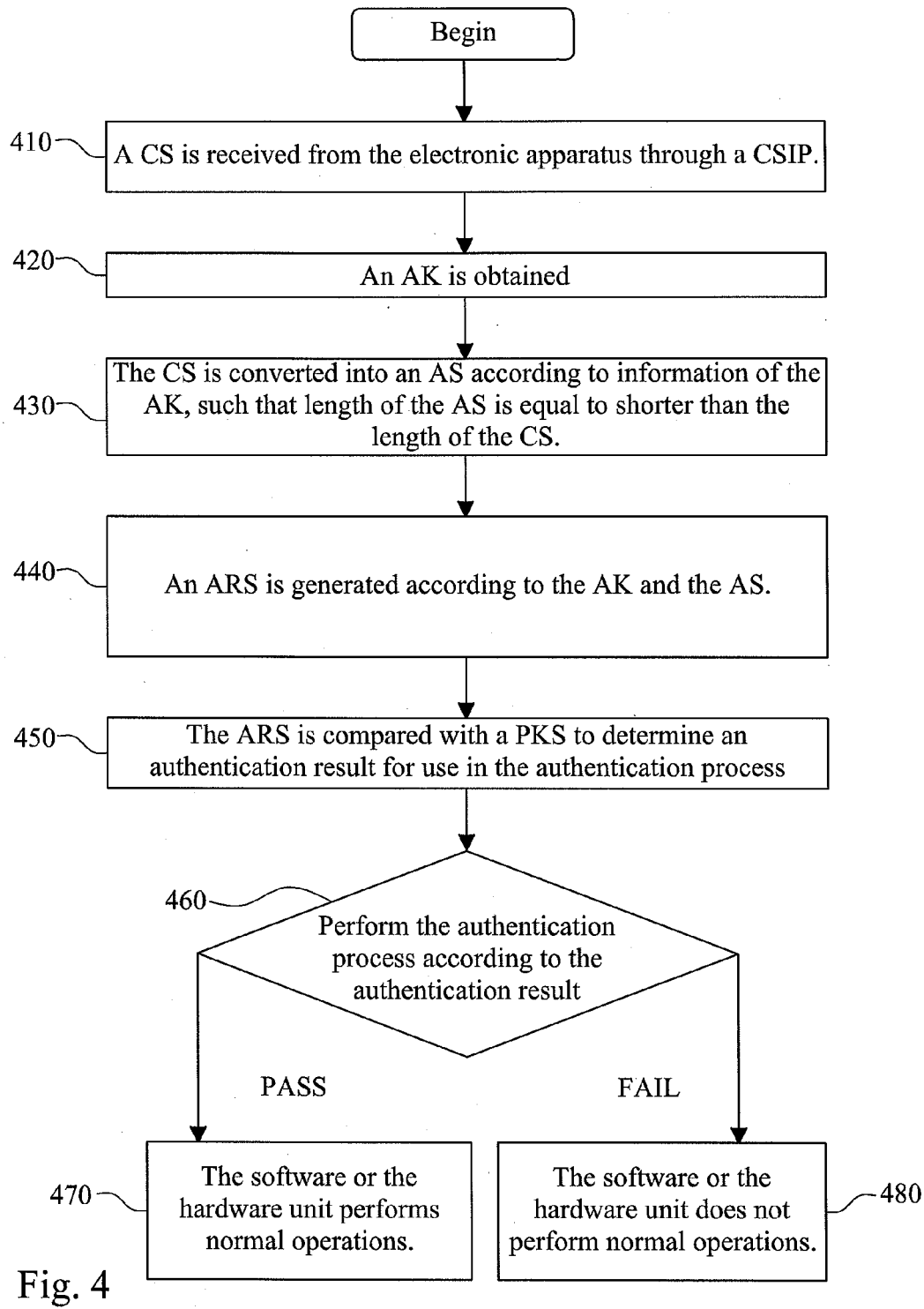
FIG. 4 is a flow diagram of a method for software-hardware authentication of an electronic apparatus according to another embodiment of this invention.

Referring to FIG. 4, a flow diagram will be described that illustrates a method for software-hardware authentication of an electronic apparatus according to another embodiment of this invention. The method for software-hardware authentication of an electronic apparatus may take the form of a computer program product stored on a non-transitory computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

The flow in FIG. 4 begins at step 410. First, a CS is received from the electronic apparatus through a CSIP (step 410). The software may be either need to authenticate the hardware of the electronic apparatus to ensure that the software can perform normal operations on the hardware, or may need to be authenticated by the hardware to gain permission for execution on the hardware. In some embodiments of this invention, the CSIP may utilize one or more hardware registers or some shared memory to receive the CS.

At step 420, an AK is obtained. The AK may be obtained from some hard-wired logic, some external inputs to the electronic apparatus, some embedded non-volatile storage of the electronic apparatus or a combination thereof. At least some portion of the AK is not known to the software, while some portion of the AK can be a known value identifying the electronic apparatus, such as the serial number of the electronic apparatus.

Next, the CS is converted into an AS according to information of the AK, such that the length of the AS is equal to or shorter than the length of the CS (step 430). In some embodiments, conversion at step 430 may be done by removing redundant data of the CS according to a portion of the information of the AK, such that the AS can be obtained. In another embodiment, conversion at step 430 may be done by compressing the CS into the AS.

After the conversion, an ARS can be generated according to the AK and the AS (step 440). The function used to generate the ARS may be a checksum function, a CRC function, a cryptography function (such as RC4, MD5, SHA-1, DES, RSA, AES, etc) or any other mapping function utilizing the entire AS and the entire or a portion of the AK to generate the ARS.

Subsequently, the ARS is compared with a PKS to determine an authentication result for use in the authentication process (step 450). In some embodiments, the pre-known signature may be formed by some hard-wired logic or be pre-stored in a storage unit for comparison. Next, the authentication process is performed according to the authentication result (step 460).

In some embodiments of this invention, the authentication result may be PASS or FAIL. Hence, when the authentication result is PASS, the authentication dependent software or hardware unit may perform normal operations (step 470). When the authentication result is FAIL, the authentication dependent software or hardware unit may not perform normal operations (step 480).

In some embodiments, CSL may also be taken into consideration for authentication. For example, an associated CSL value corresponding to the CS received through the CSIP may be verified. Next, the associated CSL value may be compared with an ECSL value associated with the AK. The authentication result may be determined further according to the result of comparing the associated CSL value with the ECSL value associated with the AK. For example, the authentication result may be determined FAIL when the ARS does not match the PKS, and the authentication result may be determined PASS when the associated CSL value is equal to the ECSL value and the ARS matches the PKS. In addition, the authentication result may be determined FALSE-FAIL when the associated CSL value is larger than the ECSL value and the ARS matches the PKS. "PASS," "FAIL" and "FALSE-FAIL" indicate three different states for the authentication process. For the authentication process, one or more types of the above-mentioned authentication results (i.e., PASS, FAIL, FALSE-FAIL, or combination thereof) may be implemented to enable or disable the authentication dependent software or hardware unit. Therefore, different degrees of authentication can be provided with respect to different types of the authentication results.

For the software to authenticate a hardware unit of the electronic apparatus, a portion of program codes of the software may require some fix-up. In this embodiment, when the authentication result is PASS, the authentication dependent software may fix-up the portion of program codes of the software, such that the software can perform normal operations (step 470). When the authentication result is FAIL, the portion of program codes of the software may remain the same, such that the software does not perform normal operations (step 480).

In some embodiments of this invention, the CS is a string of trace data generated according to some operation of the software running on the electronic apparatus. The trace data is something representing step-by-step execution behavior of a software program, or more generally of a sequence of master commands. Such trace data, like instruction execution trace data or bus transaction trace data, is usually generated by some hardware functions that monitoring software or bus master behavior by probing signals inside a microprocessor or a bus master or bus controller. The hardware functions used to generate trace data is usually controlled separately, and is not usually controllable by the software or bus master with its behavior been traced. In some embodiments, a trace data marker, which is initiated by execution of some explicit software instruction or bus master command, may be utilized to enable the possibility for capturing of trace data been controlled by the software or the bus master been traced, or other supervisor software or bus master.

In addition, the method for software-hardware authentication of an electronic apparatus may further include generating the authentication result according to the string of the trace data.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for software-hardware authentication of an electronic apparatus comprising:
   receiving a challenge string (CS) from the electronic apparatus through a challenge string input port (CSIP), wherein the CS is a string of trace data generated according to some operations of software running on the electronic apparatus;
   generating an authentication result for use in an authentication process for the software to authenticate a hardware unit of the electronic apparatus according to the string of the trace data; and
   performing the authentication process according to the generated authentication result, wherein a portion of program codes of the software requires some fix-up, and the step of performing the authentication process comprises:

fixing-up the portion of program codes of the software when the generated authentication result is PASS.

2. The method for software-hardware authentication of claim 1, wherein the trace data is representing step-by-step execution behavior of a software program or a sequence of master commands.

3. The method for software-hardware authentication of claim 1, further comprising:
utilizing a trace data marker to capture the trace data.

4. The method for software-hardware authentication of claim 1 further comprising:
obtaining an authentication key (AK);
converting the CS into an authentication string (AS) according to information of the AK, such that a length of the AS is equal to or shorter than a length of the CS;
generating an authentication result signature (ARS) according to the AK and the AS; and
further comparing the ARS with a pre-known signature (PKS) to determine the generated authentication result of the authentication process, wherein the authentication process is performed further according to the generated authentication result determined by the comparison.

5. The method for software-hardware authentication of claim 4 further comprising:
verifying an associated CS length (CSL) value corresponding to the CS received through the CSIP; and
comparing the associated CSL value with an Expected CS Length (ECSL) value associated with the AK, wherein the generated authentication result is determined further according to the result of comparing the associated CSL value with the ECSL value associated with the AK.

6. The method for software-hardware authentication of claim 5 further comprising:
determining that the generated authentication result is FAIL when the ARS does not match the PKS;
determining that the generated authentication result is PASS when the associated CSL value is equal to the ECSL value and the ARS matches the PKS; and
determining that the generated authentication result is FALSE-FAIL when the associated CSL value is larger than the ECSL value and the ARS matches the PKS.

7. An apparatus for software-hardware authentication of an electronic apparatus comprising:
a challenge string input port (CSIP), wherein a challenge string (CS) is received from the electronic apparatus through the CSIP, wherein the CS is a string of trace data generated according to some operations of software running on the electronic apparatus;
an authentication-result generating unit configured to generate an authentication result for use in an authentication process for the software to authenticate a hardware unit of the electronic apparatus according to the string of the trace data; and
an authentication performing unit configured to perform the authentication process according to the generated authentication result,
wherein a portion of program codes of the software requires fix-up, and the apparatus for software-hardware authentication of the electronic apparatus further comprises:
a fix-up unit configured to fix-up the portion of program codes of the software when the generated authentication result is PASS.

8. The apparatus for software-hardware authentication of the electronic apparatus of claim 7, wherein the apparatus for software-hardware authentication of the electronic apparatus further comprises:
a trace data filter configured to utilize a trace data marker for capturing of the trace data.

9. The apparatus for software-hardware authentication of the electronic apparatus of claim 7 further comprising:
an authentication key (AK) input unit, wherein an AK is obtained through the AK input unit;
a redundancy filter configured to convert the CS into an authentication string (AS) according to information of the AK, such that a length of the AS is equal to or shorter than a length of the CS; and
a signature comparing unit configured to generate an authentication result signature (ARS) according to the AK and the AS, and to further compare the ARS with a pre-known signature (PKS) to determine the generated authentication result, wherein the authentication performing unit performs the authentication process further according to the generated authentication result determined by the comparison.

10. The apparatus for software-hardware authentication of the electronic apparatus of claim 9, wherein:
the authentication-result generating unit verifies an associated CS length (CSL) value corresponding to the CS received through the CSIP and compares the associated CSL value with an Expected CS Length (ECSL) ECSL value associated with the AK,
wherein the signature comparing unit determines the generated authentication result further according to the result of comparing the associated CSL value with the ECSL value associated with the AK.

11. The apparatus for software-hardware authentication of the electronic apparatus of claim 10, wherein:
the signature comparing unit determines the generated authentication result is FAIL when the ARS does not match the PKS;
the signature comparing unit determines that the generated authentication result is PASS when the associated CSL value is equal to the ECSL value and the ARS matches the PKS; and
the signature comparing unit determines that the generated authentication result is FALSE-FAIL when the associated CSL value is larger than the ECSL value and the ARS matches the PKS.

12. A method for software-hardware authentication of an electronic apparatus comprising:
receiving a challenge string (CS) from the electronic apparatus through a challenge string input port (CSIP);
obtaining an authentication key (AK);
converting the CS into an authentication string (AS) according to information of the AK, such that a length of the AS is equal to or shorter than a length of the CS;
generating an authentication result signature (ARS) according to the AK and the AS;
comparing the ARS with a pre-known signature (PKS) to determine an authentication result for use in the authentication process; and
performing the authentication process according to the authentication result of the authentication process, wherein a portion of program codes of software requires fix-up, and the step of performing the authentication process comprises:
fixing-up the portion of program codes of the software when the authentication result is PASS.

13. The method for software-hardware authentication of the electronic apparatus of claim 12 further comprising:
verifying an associated CS length (CSL) value corresponding to the CS received through the CSIP; and comparing the associated CSL value with an Expected CS Length (ECSL) value associated with the AK, wherein the authentication result is determined further according to the result of comparing the associated CSL value with the ECSL value associated with the AK.

14. The method for software-hardware authentication of the electronic apparatus of claim 12 further comprising:
   determining that the authentication result is FAIL when the ARS does not match the PKS;
   determining that the authentication result is PASS when the associated CSL value is equal to the ECSL value and the ARS matches the PKS; and
   determining that the authentication result is FALSE-FAIL when the associated CSL value is larger than the ECSL value and the ARS matches the PKS.

15. The method for software-hardware authentication of the electronic apparatus of claim 12, wherein the step of converting the CS into the AS according to the information of the AK is done by removing redundant data of the CS according to a portion of the information of the AK or compressing the CS into the AS.

16. The method for software-hardware authentication of an electronic apparatus of claim 12, wherein the CS is a string of trace data generated according to some operations of software running on the electronic apparatus, and the method for software-hardware authentication of an electronic apparatus further comprises:
   generating the authentication result further according to the string of the trace data.

17. The method for software-hardware authentication of an electronic apparatus of claim 12, further comprising:
   utilizing a trace data marker to capture the trace data.

* * * * *